United States Patent
Bahrebar et al.

(10) Patent No.: US 10,184,829 B2
(45) Date of Patent: Jan. 22, 2019

(54) AQUARIUM PHOTOMETER

(71) Applicants: Soheil Bahrebar, Tehran (IR); Sajjad Bahrebar, Tehran (IR)

(72) Inventors: Soheil Bahrebar, Tehran (IR); Sajjad Bahrebar, Tehran (IR)

( * ) Notice: Subject to any disclaimer, the term of this patent is extended or adjusted under 35 U.S.C. 154(b) by 0 days.

(21) Appl. No.: 15/516,371

(22) PCT Filed: Aug. 2, 2015

(86) PCT No.: PCT/IB2015/055856
§ 371 (c)(1),
(2) Date: Mar. 31, 2017

(87) PCT Pub. No.: WO2017/021756
PCT Pub. Date: Feb. 9, 2017

(65) Prior Publication Data
US 2017/0299430 A1 Oct. 19, 2017

(51) Int. Cl.
*H01J 40/14* (2006.01)
*G01J 1/44* (2006.01)
(Continued)

(52) U.S. Cl.
CPC .............. *G01J 1/44* (2013.01); *A01K 63/006* (2013.01); *A01K 63/06* (2013.01); *G01J 1/0219* (2013.01);
(Continued)

(58) Field of Classification Search
CPC ....... F21V 33/00; F21V 33/0004; F21V 21/00
(Continued)

(56) References Cited

U.S. PATENT DOCUMENTS 2,542,299 A 2/1951 Archer et al.
5,345,305 A 6/1994 Chen
(Continued)

FOREIGN PATENT DOCUMENTS

GB 2126339 A 3/1984

OTHER PUBLICATIONS

PCT/IB2015/055856 Written Opinion of the International Searching Authority dated Apr. 26, 2016.
(Continued)

*Primary Examiner* — Kevin Pyo
(74) *Attorney, Agent, or Firm* — NovoTechIP International PLLC

(57) ABSTRACT

An aquarium photometer system includes a housing unit, an arm, and a mirror. The housing unit includes a light sensor configured to sense light incident on the light sensor and to convert the incident light to a signal. The housing unit also includes an operational amplifier including a first input node, a second input node, and an output node. The operational amplifier is configured to: receive the signal at the first input node, amplify a difference between the signal at the first input node and a signal at the second input node by a gain factor, and output the amplified signal on the output node. The housing unit also includes a potentiometer connected to the operational amplifier and configured to regulate the amplified signal; and a display connected to the potentiometer and configured to show an intensity of light detected by the light sensor based on the regulated amplified signal. The arm at a first end is connected to the housing unit and configured to move the housing unit around an aquarium case. The mirror is located on a bar and positioned within the aquarium in front of the light sensor and at a focal distance from the light sensor and configured to increase an amount of light incident on the light sensor.

20 Claims, 4 Drawing Sheets

(51) Int. Cl.
*G01J 1/02* (2006.01)
*G01J 1/04* (2006.01)
*A01K 63/06* (2006.01)
*G01J 1/16* (2006.01)
*G01J 1/18* (2006.01)
*A01K 63/00* (2017.01)

(52) U.S. Cl.
CPC ........... *G01J 1/0247* (2013.01); *G01J 1/0266* (2013.01); *G01J 1/0271* (2013.01); *G01J 1/0403* (2013.01); *G01J 1/0411* (2013.01); *G01J 1/0448* (2013.01); *G01J 1/16* (2013.01); *G01J 1/18* (2013.01); *G01J 2001/4406* (2013.01)

(58) Field of Classification Search
USPC ...... 250/221, 214 R, 214 A; 362/101, 217.1, 362/276
See application file for complete search history.

(56) References Cited

U.S. PATENT DOCUMENTS

| | | | |
|---|---|---|---|
| 6,074,071 A * | 6/2000 | Baumberg | A01K 63/06 313/506 |
| 9,603,346 B2 * | 3/2017 | Lutz | A01K 63/06 |
| 2009/0009501 A1 | 1/2009 | Shiba | |

OTHER PUBLICATIONS

International Search Report dated Apr. 26, 2016 from International Patent Application No. PCT/IB2015/055856.

* cited by examiner

AQUARIUM PHOTOMETER

CROSS-REFERENCE TO RELATED APPLICATIONS

This application is a National Stage of International patent application PCT/IB2015/055856, filed on Aug. 2, 2015, the disclosure of which is incorporated by reference in its entirety.

BACKGROUND

The aquarium lighting typically includes fluorescent bulbs, halogen incandescent bulbs, or metal halide incandescent bulbs. The aquarium lighting are typically used to support the growth of marine life, including marine plants, coral, and potentially algae. Different types of marine life will prefer different specific wavelengths and amount of light, both in terms of encouraging growth, and also in terms of encouraging specific behaviors and effects. It may be beneficial to vary the amount of light to ensure that sufficient light is provided to marine life located at a specific depth in the aquarium.

Hence, there is a need for a system that can accurately detect the amount of light at a specific depth of aquarium and convey that to the reader on a display.

SUMMARY

In one general aspect, the instant application describes an aquarium photometer system that includes a housing unit, an arm, and a mirror. The housing unit includes a light sensor configured to sense light incident on the light sensor and to convert the incident light to a signal. The housing unit also includes an operational amplifier including a first input node, a second input node, and an output node. The operational amplifier is configured to: receive the signal at the first input node, amplify a difference between the signal at the first input node and a signal at the second input node by a gain factor, and output the amplified signal on the output node. The housing unit also includes a potentiometer connected to the operational amplifier and configured to regulate the amplified signal; and a display connected to the potentiometer and configured to show an intensity of light detected by the light sensor based on the regulated amplified signal. The arm at a first end is connected to the housing unit and configured to move the housing unit around an aquarium case. The mirror is located on a bar and positioned within the aquarium in front of the light sensor and at a focal distance from the light sensor and configured to increase an amount of light incident on the light sensor.

The above general aspect may include one or more of the following features. The mirror may include a concave mirror having a diameter of 10 cm and may be configured to transfer light from an area with limited visibility to the light sensor to the light sensor. The display may include a digital display. The display may include a Light Emitting Diode Display. The display may include a Light Crystal Display.

The system may further include a processor configured to receive the amplified signal, calculate a lux corresponding to the amplified signal and display the lux on the display. The system may further include transmitting a signal over a network to a device remotely located from the housing unit. The network may include a short range wireless communication network. The short range wireless communication network may include a Bluetooth network. The device may include a personal computer of the user. The processor may be configured to compare the lux against a threshold to determine whether the lux exceeds a threshold and send an alert signal to the device upon determining the lux exceeds the threshold. The light sensor may include a photodiode. The operational amplifier may include a LM324 operational amplifier. The potentiometer may include a slide pot, a thumb pot, or a trimpot potentiometer.

The system may further include a battery for activating the aquarium photometer system. The system may further include a terminal configured to connect the aquarium photometer system to an electrical outlet. The system may further include a switch configured to turn ON and OFF the aquarium photometer system.

The foregoing and other objects, features, aspects and advantages of the present invention will become more apparent from the following detailed description of the present application when taken in conjunction with the accompanying drawing.

BRIEF DESCRIPTION OF THE DRAWINGS

The drawings depict one or more implementations in accord with the present teachings, by way of example only, not by way of limitation. In the figures, like reference numerals refer to the same or similar elements.

DETAILED DESCRIPTION

Figure 1:
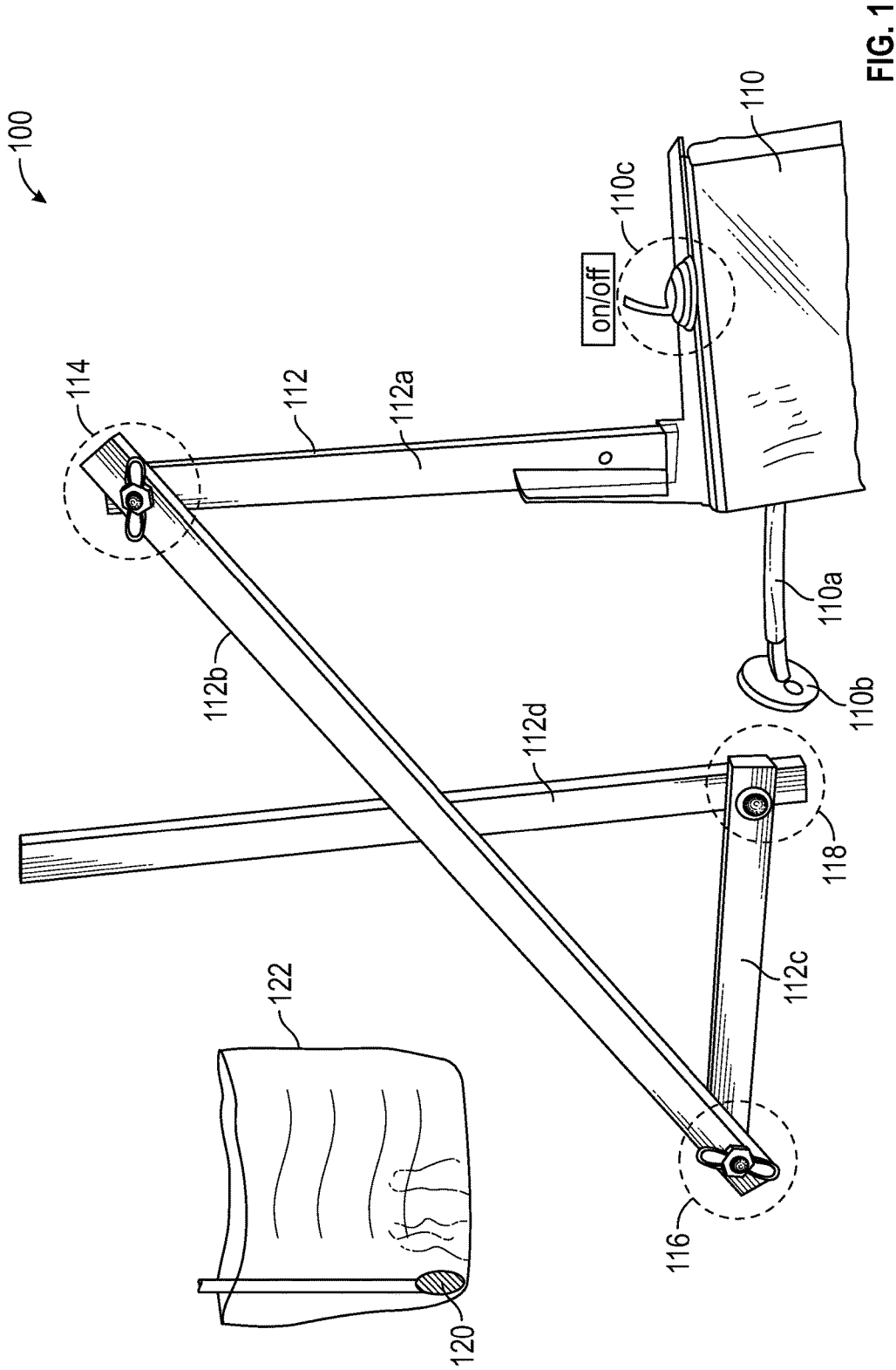
FIG. 1 illustrates an exemplary aquarium photometer system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As noted above, light properties including intensity, wavelength, band, etc. are important factors to the life and growth of animals and plants living inside water such as, for example, those living in an aquarium. To this end, it is important to identify light properties at different depths in the aquarium and to adjust them for optimal growth of the animals and plants living inside the aquarium.

The instant application describes an aquarium photometer system that is configured to determine the light property in a water container such as, for example, an aquarium. The light property may include, for example, a light intensity. The system may be calibrated with experimental condition describing an optimal light intensity at various depths. If the light intensity measured by the system does not correspond to the previously determined optimal light intensity, an alert may be generated. The generated alert may be sent to the user. The user may be locally located with respect to the aquarium photometer system. Alternatively or additionally, the user may be remotely located with respect to the aquarium photometer system. In either case, responsive to the generated alert, the user may adjust the light intensity to correspond to the optimal light intensity at the given depth. The optimal light intensity at the given depth may depend on the marine life existing at that depth. The system may be programmed to know the different marine life existing at different depths of the aquarium and the corresponding light intensity for each.

In one specific example, the system includes a housing unit, an arm, and a mirror. The housing unit includes a light sensor, an operational amplifier, a potentiometer, and a display. The light sensor is configured to sense light incident on the light sensor and to convert the incident light to a signal (e.g., an electricity or voltage). The signal is provided to a first input node of the operational amplifier. The operational amplifier is configured to amply the difference between the signal at the first input node and a signal at the second input node (usually tied to ground) by a gain factor. The amplified difference is then output on the output node of the operational amplifier. The output node is connected to a display and to the potentiometer. The potentiometer may configured to control the gain factor of the operational amplifier to ensure that proper reading is provided on the display. In one specific example, the potentiometer is configured to regulate the output voltage such that when the intensity of the sensed light is below a certain intensity threshold, the meter on the display is get at a certain position. The display is configured to show the light intensity at a given depth.

The system includes a movable arm configured to rotate the system around inside and/or outside of the aquarium. By being placed next to the glass walls of the aquarium, the system can detect the intensity of light at a given depth and display the detected intensity on the display. In some scenarios, an area within the aquarium may be blocked from the visual field of the system. Therefore, the system may not be able to accurately determine the intensity of light in that specific area. To this end, the system may include one or more mirrors placed inside the aquarium. The mirror(s) may be placed in the area blocked from the visual field of the system, in front and at a focal distance from the light sensor. The mirror receives the light from the area and redirects the light to the system for processing.

Reference now is made in detail to the examples illustrated in the accompanying drawings and discussed below. FIG. 1 illustrates an exemplary aquarium photometer assembly 100. The assembly 100 includes a housing 110, an arm 112, and a mirror 120. The housing 110 includes a circuitry for determining the light intensity inside the aquarium 122. The circuitry is described in more details with respect to FIGS. 2 and 3. The housing 110 also includes a tube 110*a* and a light sensor 110*b*. The tube 110*a* is configured to extend outside of the housing 110 and to contract back into the housing 110. The light sensor 110*b* is configured to sense the light and convert light to either current or voltage. In one specific example, the light sensor 110*b* includes a photodiode. In another example, the light sensor 110*b* is a light-dependent resistor. The current or voltage is provided to the circuitry inside the housing 110, which utilizes them to determine the light intensity within the aquarium. The housing 110 may further include a switch 110*c* configured to turn the circuitry inside the housing 110 ON and OFF.

The arm 112 includes sections 112*a*, 112*b*, 112*c*, and 112*d*. The section 112*a* is pivotally connected to section 112*b* via a fastening element 114. Similarly, the section 112*b* is pivotally connected to second 112*c* via a fastening element 116. The section 112*c* is pivotally connected to section 112*d* via a fastening element 118. The fastening elements 114, 116, and 118 may include a bolt and a nut. The user may hold the arm section 112*d* and pivotally move the various sections 112*a*-112*d* with respect to each other to place the housing 110 at a desired location adjacent to the aquarium 122.

The system 100 also includes a mirror 120 and a rod 124. The mirror is coupled to one end of the rod 124. Using the rod 124, the user may place the mirror 120 in an area of the aquarium 122 blocked from the visual field of the system 100. The mirror 120 may be placed in front and at a focal distance from the light sensor 110*b*. The mirror 120 may receive the light from the area and redirect the light to the light sensor 110*b* for processing.

Figure 2:
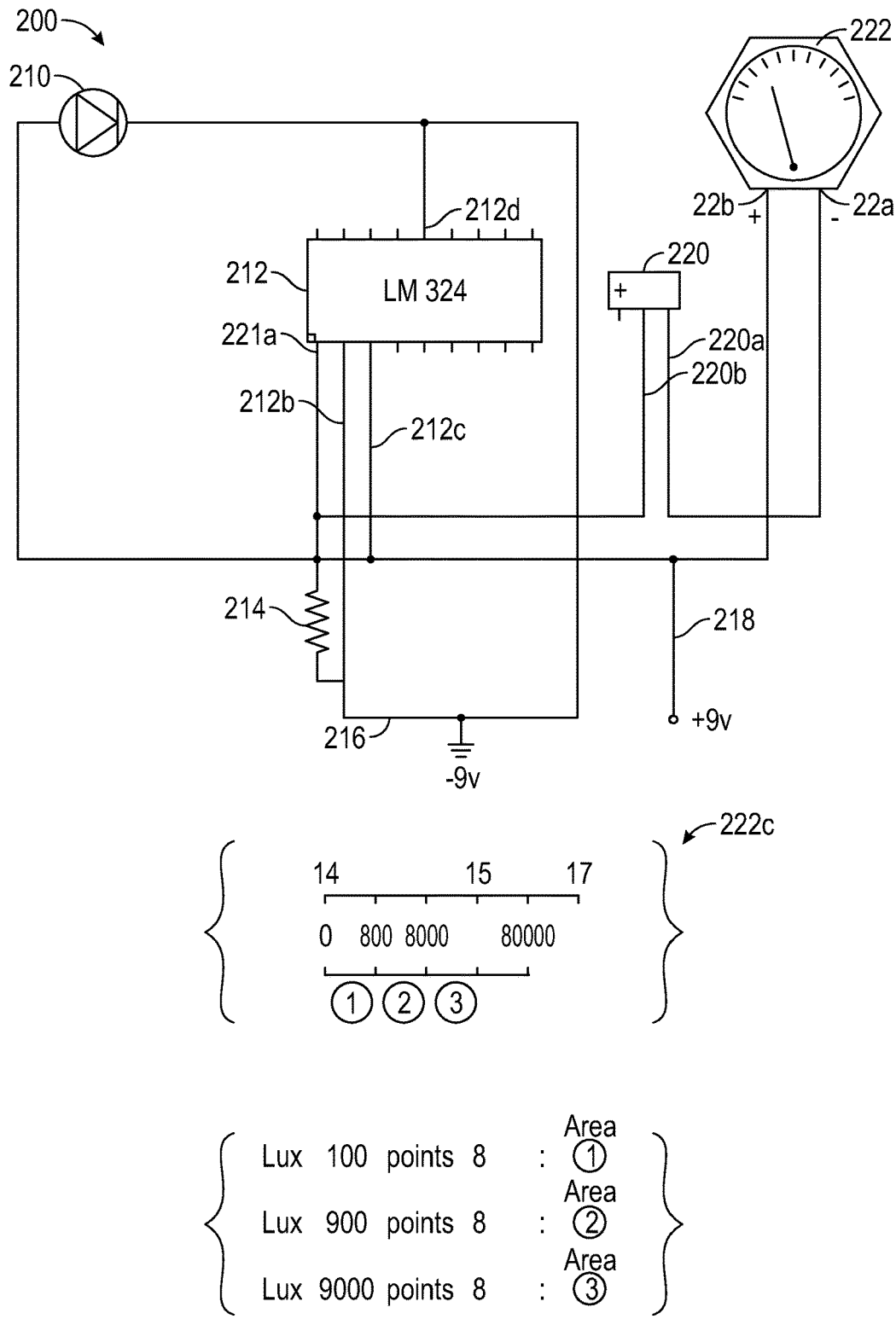
FIG. 2 illustrates a circuit diagram of the exemplary aquarium photometer system shown in FIG. 1.

FIG. 2 illustrates an exemplary circuit 200 that may be placed within the housing 110 of the aquarium photometer system 100 shown in FIG. 1. The circuit 200 includes a light sensor 210, an operational amplifier 212, a potentiometer 220, and a display 222. The light sensor 210 may be a photodiode. The light sensor 210 at one end may be connected to a ground terminal and at another end connected to the operational amplifier 212. The ground terminal may be fixed at zero voltage or at some other voltage. In the illustrated example, the ground terminal is fixed at −9 volt and the light sensor is connected to the ground terminal through resistor 214. The light sensor 210 is configured to convert the incident light into a signal (e.g., electricity or voltage) and provide the signal to the operational amplifier 212.

The operational amplifier 212 includes nodes 212*a*-212*d*. The node 212*a* is an input node and is configured to receive the signal from the light sensor 210. The node 212*b* is an output node and connects the operational amplifier 212 to the potentiometer 220. The node 212*c* connects the operational amplifier 212 to the negative power terminal 216 and node 212*d* connects the operational amplifier 212 to the positive power terminal 218. Although not shown, in addition to being a power node, the node 212*c* may also act as a second input node to the operational amplifier.

The negative power terminal may be maintained at −9 volt and the positive power terminal may be maintained at +9 volt. The operational amplifier 212 is configured to amplify the difference between the signal at the input node 212*a* and the signal at the input node 212*c* by a gain factor and output the amplified signal on the output terminal 212*b*. The potentiometer 220 receives the amplified signal from the operational amplifier 212 at its node 220*a* and regulate the amplified signal.

In one specific example, the operational amplifier 212 regulates the amplified signal to ensure that the display initial conditions are satisfied. In the scenario in which the display 222 includes a galvanometer, the display initial conditions may include associating a specific number (e.g., number 14) on the galvanometer display 222 with a zero light intensity. Therefore, if the detected light intensity is zero or is otherwise below a certain threshold, the potentiometer 220 regulates the output of the amplifier 212 to maintain the handle of the galvanometer 222 at the specific number (e.g., the number 14) to reflect zero light intensity. Once the light intensity exceeds zero or the certain threshold, the handle of the galvanometer display 222 moves to the right to reflect the intensity level detected.

To this end, the regulated amplified output is provided from node 220*b* of the potentiometer 220 to the node 222*a* of the display 222. The other node 222*b* of the display is connected to the positive power terminal 218. The display 222 is configured to show the light intensity at a given area of the aquarium. The given area corresponds to the area from which the light sensor 210 receives light.

In one specific example, the display 222 is a galvanometer having a display 222c with a numerical range from 0 to 17. The numerical range of 0 to 14 is designed to show light intensity of 0; whereas the numerical range after 14 shows the light intensity of above zero. One of ordinary skill understands other alternatives are contemplated. For example, the numerical range from 1 forward can show the light intensity of above zero.

The display 222c may be further divided into three areas. The first area may be further divided into 8 incremental points with each point showing a lux of 100. The second area may be further divided into 8 incremental points with each point showing a lux of 900. The third area may be further divided into 8 incremental points with each point showing a lux of 9000. In keeping with the previous example, the first area may begin at the number 14 and may end at some point between numbers 14 and 15. The second area may begin at the ending point of the first area and may end at some point before number 15. The third area may begin at the ending part of the second area and may end at some point between numbers 15 and 17. The ending part of the first area shows a lux of 800. The ending part of second area shows a lux of 8000. The ending part of the third area shows a lux of 80000.

Figure 3:
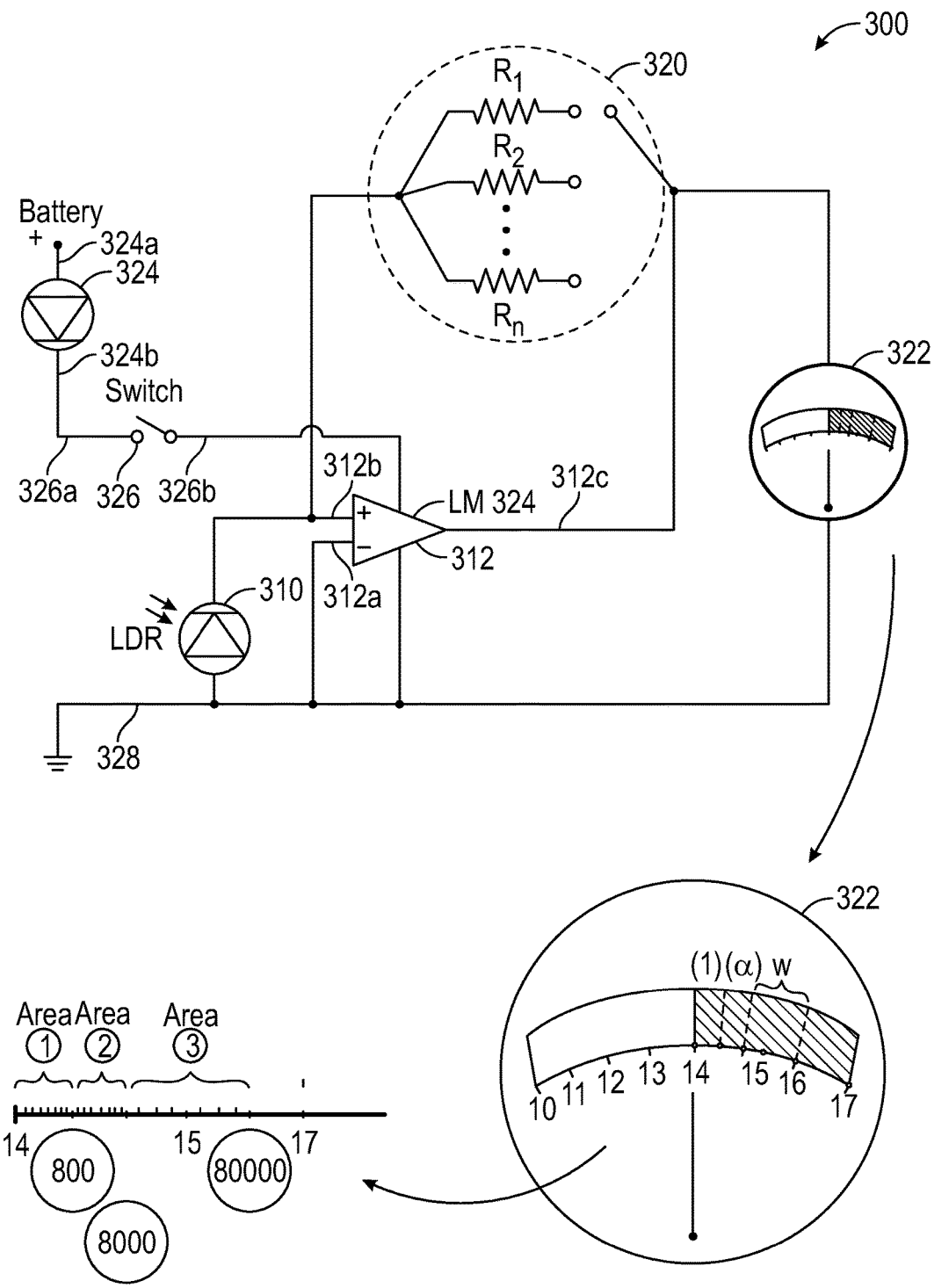
FIG. 3 illustrates the circuit diagram of the exemplary aquarium photometer system shown in FIG. 2 in more details.

FIG. 3 illustrates the circuit diagram 300 of the exemplary aquarium photometer system shown in FIG. 2 in more details. The circuit diagram 300 includes a light sensor 310, an operational amplifier 312, a potentiometer 320, and a display 322. The light sensor 310 at one end is connected to the operational amplifier 312 and at another end is connected to the ground terminal. The light sensor 310 may include a photodiode light sensor configured to covert the incident light to electricity or voltage. This electricity or voltage is provided to the operational amplifier 312.

The operational amplifier 312 includes an inverting terminal 312a, a non-inverting terminal 312b, a positive power terminal, a negative power terminal, and an output terminal 312c. The inverting terminal 312a is connected to the ground terminal 328. The non-inverting terminal 312b is connected to the light sensor 310 to receive the electricity or voltage generated by the light sensor 310. The operational amplifier 312 is configured to amplify the difference between the inverting terminal 312a and non-inverting terminal 312b and output the amplified difference as an output signal on the output terminal 312c. The output terminal 312c of the operational amplifier 312 is connected to the potentiometer 320 and to the display 322. In one specific example, the operational amplifier 312 includes an LM324 operational amplifier.

The potentiometer 320 is connected at one end to the output terminal 312c and at another end to the non-inverting terminal 312b. The potentiometer 320 may be configured to regulate the output signal to ensure the initial conditions of the display 322 are satisfied as described above with respect to FIG. 2. The potentiometer 320 may also be configured to adjust the gain factor of the operational amplifier 312. The potentiometer 320 may include a slide pot, a thumb pot, or a trimpot potentiometer.

The output terminal 312c is also connected to the display 320 configured to display the intensity of the light incident on the light sensor 310. The display 322 is shown to be a galvanometer and may be adapted to have a numerical range of 10 to 17. In one specific example, the numerical range 10 to 14 corresponds to the light intensity of 0; whereas, the numerical range after 14 shows the light intensity of above zero. One of ordinary skill understands other alternatives are contemplated. For example, the numerical range from 10 forward can show the light intensity of above zero.

Similar to the display 222c, the display 322 may be further divided into three areas. The first area may be further divided into 8 incremental points with each point showing a lux of 100. The second area may be further divided into 8 incremental points with each point showing a lux of 900. The third area may be further divided into 8 incremental points with each point showing a lux of 9000. In keeping with the previous example, the first area may begin at the number 14 and may end at some point between numbers 14 and 15. The second area may begin at the ending point of the first area and may end at some point before number 15. The third area may begin at the ending part of the second area and may end at some point between numbers 15 and 17. The ending part of the first area shows a lux of 800. The ending part of second area shows a lux of 8000. The ending part of the third area shows a lux of 80000.

The display meter moves based on the amount of detected light intensity. The more the light intensity, the further the meter will be placed toward the right of the display 322. The lower the light intensity, the further the meter may be placed toward the center of the display 322 in a scenario the number 14 reflects the zero intensity. In one specific example, the intensity shown on the display 322 is compared against previously identified experimental data to determine whether the detected light intensity corresponds to the optimal light intensity for the identified parameters. The identified parameters may include the depth of the water at which the light intensity reading is being performed by the system 100. The identified parameters may also include the type of plants and animal present at the given depth. If the detected light intensity is greater than the previously identified optimal light intensity, the lighting of the aquarium 122 may be reduced to bring down the light intensity to the optimal level. If the detected light intensity is less than the previously identified optimal light intensity, the lighting of the aquarium 122 may be increased to bring up the light intensity to the optimal level.

In another implementation, the display 322 may include a digital display. The digital display may include a Light Crystal Display and/or Light Emitting Diode Display. The digital display may be configured to digitally show the detected light intensity.

The system may further include a battery 324 and a switch 326. The battery 324 includes terminals 324a and 324b. The terminal 324a is connected to the positive voltage and terminal 324b is connected to the switch 326. The switch includes terminals 326a and 326b. The terminal 326a is connected to the terminal 324b and the terminal 326b is connected to the power terminal of the operational amplifier 312. The switch is configured to turn on and off the circuit 300. In a close state, the switch 326 provides power to the operational amplifier 312. In an open state, the switch 326 cuts the power to the operational amplifier 312.

In one implementation, the aquarium photometer system may further be configured to include a processor. The processor may be configured to receive the amplified output signal, calculate a lux corresponding to the amplified voltage, and display the calculated lux on the digital display. The processor may further be programmed to include an optimal lux for various conditions. The conditions may include the water depth at which light intensity is being measured and the type of marine life at that depth. The optimal lux may be previously programmed into a memory accessible to the processor. The optimal lux may be associated with multiple factors. For example, the optimal lux for an angel fish at 40 cm depth may be 800 and increases as the depth increases. For example, the optimal lux for the angel fish at 50 cm depth may be 900; whereas, at 70 cm may be 1000. The optimal lux may be previously observed and may correspond to a lux that provides the best growth condition for the marine life, in this case the angel fish. For another example, the optimal lux for discus fish may be the same as that of angel fish defined above. For another example, the optimal lux for gourami fish may be more compared to the angel fish. To illustrate, the optimal lux for the gourami fish at 40 cm depth may be 900, at 50 cm depth may be 1000, and at 70 cm may be 12000.

In one implementation, the system may be programmed to receive information about the type of marine life at a given depth subject to the light intensity analysis and provide the optimal lux for the identified marine life. The information may be automatically received via a camera attached to the system or may be manually inputted to the system via a keyboard or touch sensitive display. The system may also receive information about the depth at which the light intensity is being measured. This information may be manually inputted or automatically determined. For example, the aquarium photometer system may include a depth meter device configured to detect depth relative to the surface of the water.

Once the depth and the type of marine life are identified, the system may then determine the optimal lux and compare the optimal lux with the measured lux. In one example, the processor included in the housing 110 determines the optimal lux and compares the optimal lux with the measured lux. In another example, the processor sends the relevant information to a server to determine the optimal lux and the server compares the optimal lux with a measured lux. In either case, if the measured lux does not correspond to the optimal lux, an alert message may be generated and forwarded to the user. The alert message may be displayed on the display located on the housing of the system and/or a display located remote from the housing. To this end, the system may be in communication with another device over a wired or a wireless network. The wireless network may include a short range wireless communication network such as, for example, Bluetooth, Zigbee, Near Field Communication (NFC). The wireless network may include any other type of wireless network such as, for example, cellular network, Wi-Fi network, wireless LAN, wireless mesh, etc. The wired network may include telephone network, cable network, fiber-optic network, etc. The other device may be a personal computer.

As shown by the above discussion, functions relating to identifying the optimal lux and comparing it to the measured lux may be implemented on computers connected for data communication via the components of a packet data network, operating as aquarium photometer system, a server, and a personal computer. Although special purpose devices may be used, such devices also may be implemented using one or more hardware platforms intended to represent a general class of data processing device commonly used to run "server" programming so as to implement the above-described functions, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for storing optimal lux information and related data. The software code is executable by the general-purpose computer that functions as a server, a personal computer, and/or an aquarium photometer system. In operation, the code is stored within the general-purpose computer platform. Execution of such code by a processor of the computer platform enables the platform to implement the methodology for displaying the measured lux, identifying an optimal lux and comparing the optimal lux with the measured lux to control the amount of light entering the aquarium, in essentially the manner performed in the implementations discussed and illustrated herein.

Figure 4:
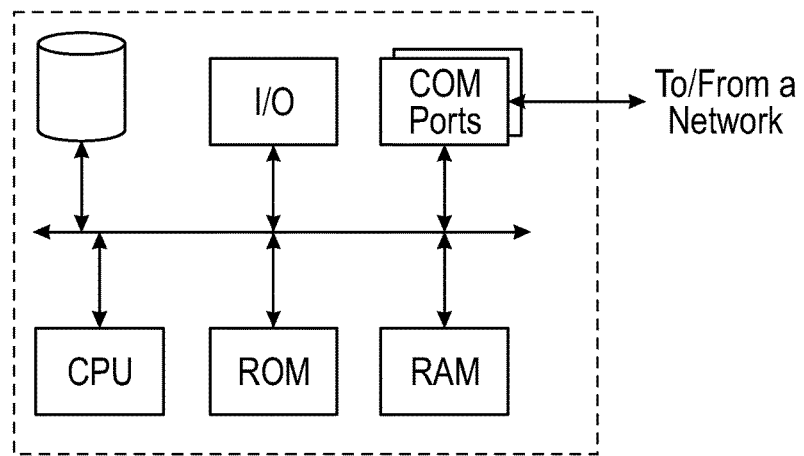
FIG. 4 illustrates a simplified functional block diagram of a computer that may be configured as a host or server, for example.
Figure 5:
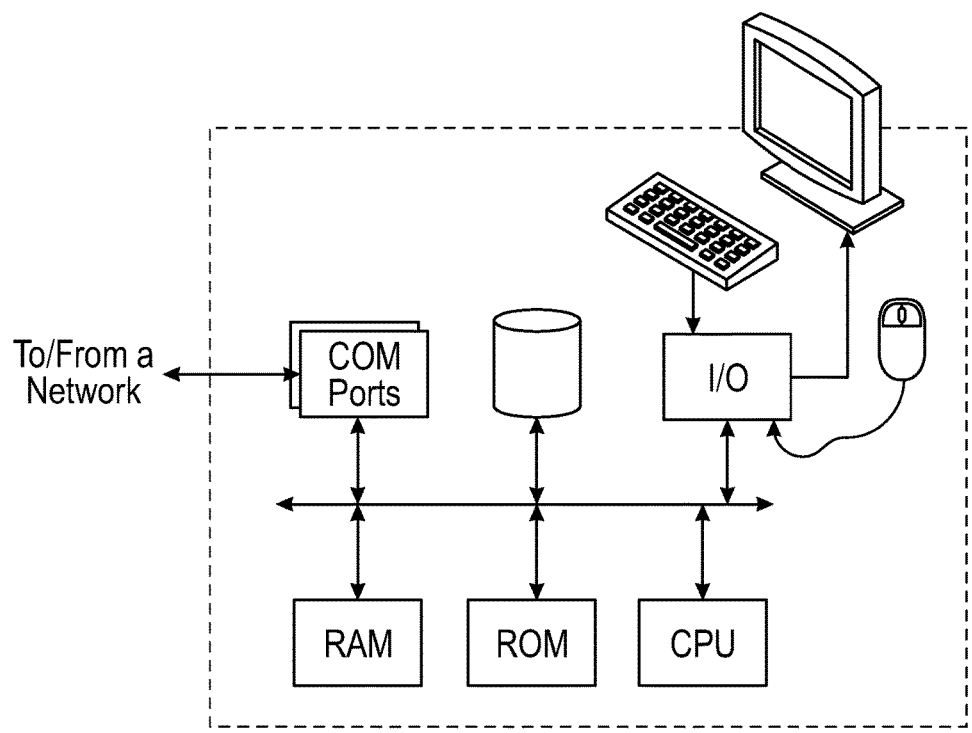
FIG. 5 illustrates a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods outlined above may be embodied in programming Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functionalities described above. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An aquarium photometer system for use with an aquarium, the aquarium photometer system comprising:
    a housing unit including:
        a light sensor configured to sense light incident on the light sensor and to convert the incident light to a signal;
        an operational amplifier including a first input node, a second input node, and an output node, the operational amplifier configured to: receive the signal at the first input node, amplify a difference between the signal at the first input node and a signal at the second input node by a gain factor, and output the amplified signal on the output node;
        a potentiometer connected to the operational amplifier and configured to regulate the amplified signal; and
        a display connected to the potentiometer and configured to show an intensity of light detected by the light sensor based on the regulated amplified signal;
    a movable arm connected to the housing unit, the movable arm being configured to pivotally move the housing unit;
    a mirror positioned within the aquarium in front of the light sensor and at a focal distance from the light sensor and configured to increase an amount of light incident on the light sensor; and
    wherein the aquarium photometer system is configured to generate an alert signal if a light intensity measured by the aquarium photometer system does not correspond to a previously determined optimal light intensity.

2. The aquarium photometer system of claim 1, wherein the mirror includes a concave mirror having a diameter of 10 cm, the mirror being configured to transfer light from an area with limited visibility to the light sensor.

3. The aquarium photometer system of claim 1, wherein the display includes a digital display.

4. The aquarium photometer system of claim 1, wherein the display includes a Light Emitting Diode Display.

5. The aquarium photometer system of claim 1, wherein the display includes a Light Crystal Display.

6. The aquarium photometer system of claim 1, further comprising a processor configured to receive the amplified signal, calculate a lux corresponding to the amplified signal and display the lux on the display.

7. The aquarium photometer system of claim 6, further comprising transmitting a signal over a network to a device remotely located from the housing unit.

8. The aquarium photometer system of claim 7, wherein the network includes a short range wireless communication network.

9. The aquarium photometer system of claim 8, wherein the short range wireless communication network includes a Bluetooth network.

10. The aquarium photometer system of claim 8, wherein the device includes a personal computer.

11. The aquarium photometer system of claim 8, wherein the processor is configured to compare the lux against a threshold to determine whether the lux exceeds a threshold and send the alert signal to the device upon determining the lux exceeds the threshold.

12. The aquarium photometer system of claim 1, wherein the light sensor includes a photodiode.

13. The aquarium photometer system of claim 1, wherein the operational amplifier includes a LM324 operational amplifier.

14. The aquarium photometer system of claim 1, wherein the potentiometer includes a slide pot, a thumb pot, or a trimpot potentiometer.

15. The aquarium photometer system of claim 1, further comprising a battery for activating the aquarium photometer system.

16. The aquarium photometer system of claim 1, wherein the aquarium photometer system can be programmed to receive information about the type of marine life associated with the aquarium and a water depth of the aquarium.

17. The aquarium photometer system of claim 16, wherein the information about the type of marine life is automatically received via a camera attached to the system.

18. The aquarium photometer system of claim 16, wherein the information about the type of marine life is manually inputted to the system via a keyboard or touch sensitive display.

19. The aquarium photometer system of claim 1, further comprising a depth meter device configured to detect water depth relative to a surface of water in the aquarium.

20. The aquarium photometer system of claim 11, wherein a memory that is accessible to the processor is programmed to include an optimal lux depending on a type of marine life and a water depth at which light intensity is being measured.

* * * * *